(12) United States Patent
Ciaramitaro (10) Patent No.: US 11,176,619 B1
(45) Date of Patent: Nov. 16, 2021

(54) TAX INTERVIEW WITH THIRD-PARTY DATA SOURCE INTEGRATION

(71) Applicant: HRB Innovations, Inc., Las Vegas, NV (US)

(72) Inventor: Mark Ciaramitaro, Leawood, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 530 days.

(21) Appl. No.: 14/837,868

(22) Filed: Aug. 27, 2015

(51) Int. Cl.
*G06Q 40/00* (2012.01)

(52) U.S. Cl.
CPC .................................. *G06Q 40/123* (2013.12)

(58) Field of Classification Search
CPC .................................................... G06Q 40/123
See application file for complete search history.

(56) References Cited

U.S. PATENT DOCUMENTS

| | | | |
|---|---|---|---|
| 7,769,647 B1 * | 8/2010 | Char | G06Q 40/123 705/31 |
| 8,744,948 B1 * | 6/2014 | McVickar | G06Q 40/12 705/31 |
| 9,298,763 B1 * | 3/2016 | Zack | G06F 16/337 |
| 10,346,927 B1 * | 7/2019 | Lunt | G06Q 40/123 |
| 2006/0178961 A1 * | 8/2006 | Stanley | G06Q 40/02 705/31 |
| 2012/0109792 A1 * | 5/2012 | Eftekhari | G06Q 40/02 705/31 |
| 2013/0103420 A1 * | 4/2013 | Massoumi | G06Q 10/103 705/3 |
| 2016/0217534 A1 * | 7/2016 | Goldman | G06Q 40/123 |
| 2017/0004583 A1 * | 1/2017 | Wang | G06Q 40/123 |

FOREIGN PATENT DOCUMENTS

CN           103559207 A   *   2/2014

OTHER PUBLICATIONS

Bossard et al.; "Event Recognition in Photo Collections with a Stopwatch HMM"; 2013; IEEE; "2013 IEEE International Conference on Computer Vision"; pp. 1193, 1195, and 1200 (Year: 2013).*

* cited by examiner

*Primary Examiner* — Bennett M Sigmond
*Assistant Examiner* — Bolko M Hamerski
(74) *Attorney, Agent, or Firm* — Erise IP, P.A.

(57) ABSTRACT

A method, system, and computer program for presenting a tax interview in preparation for preparing a tax return and, more particularly, to an advanced tax interview engine that integrates with third-party data sources including social networking sites, professional networking sites, credit reports, data aggregators, and other sources so as to minimize the burden on a user. One or more profiles for the taxpayer are retrieved from their respective third-party data sources so as to pre-populate responses to the tax interview, present additional portions of the tax interview, or determine discrepancies with user-entered information.

16 Claims, 5 Drawing Sheets

Social Media Accounts ~408

- ☑ Facebook — 👤 John Taxpayer ▷
- ☐ MySpace — 👤 John A. Taxpayer ▷
- ☑ LinkedIn — 👤 John Taxpayer (Manager at Employ Co) ▷

Credit Reports ~410

- ☑ Transunion — John Taxpayer — xxx-xx-1234
- ☑ Experian — John Taxpayer — xxx-xx-1234

Other Accounts ~412

- ☑ AmeriTrade — j.taxpayer / ******** (username / password)
- ⊞ Add Account

Other Databases

- ☑ Allow All (⊞)

username ~402
password ~404
SSN ~406

[Sign In]

John Taxpayer
xxx-xx-1234

Basic Information
Import Tax Documents
Deductions
Finalize Return
File Return

It looks like you're married. Is this correct? ~502
● Yes
○ No

Do you still live at 1234 Main St. in Anytown, ST? ~504
● Yes
○ No, I live at

| 5678 Johnson Drive |
| 91011 Jefferson St. |
| 12131 42st Ave |
| Other |

Import W-2s
☑ Employ Co ~506
⊞ Add Another
Import 1099s
☑ AmeriTrade ~508
☐ US Bank ~510

TAX INTERVIEW WITH THIRD-PARTY DATA SOURCE INTEGRATION

BACKGROUND

1. Field

Embodiments of the invention generally relate to a tax interview in preparation for preparing a tax return and, more particularly, to an advanced tax interview that integrates with third-party data sources so as to minimize the burden on a user.

2. Related Art

Traditionally, the first step of preparing a tax return for a taxpayer is the tax interview, which gathers demographic and financial information for the taxpayer in order to determine which tax forms must be prepared. Because the interview is the base on which the return is prepared, errors or omissions in the tax interview can lead to incorrectly prepared returns.

For returning customers, the initial tax interview can be completed much more quickly and accurately, because information can be imported from prior years' tax returns and presented to the user for confirmation or corrections. However, for new taxpayers, or returning taxpayers who have experienced life events that have changed their tax situations, the possibility exists for errors or omissions that can lead to errors in the tax preparation process. Accordingly, there is a need for an advanced tax interview that can automatically determine basic demographic and financial information for a taxpayer and recognize significant life events.

SUMMARY

Embodiments of the invention address the above need by providing an advanced tax interview that integrates with various third-party data sources to determine relevant tax information for a taxpayer. In particular, in a first embodiment, the invention includes a method for automated population of responses to a tax interview based on third-party data sources, comprising the steps of receiving a request, from a user, to prepare a tax return for a taxpayer, receiving information identifying the taxpayer, retrieving a profile for the taxpayer from a third-party data source, determining, based on the profile, a response to a question in the tax interview, pre-populating the tax interview with the response to the question in the tax interview, presenting the tax interview with the pre-populated response to the user for confirmation, receiving confirmation, from the user, that the pre-populated response is correct, and preparing the tax return based on the pre-populated response.

In a second embodiment, the invention includes a system for conducting a tax interview with a user for a taxpayer, comprising a server for communicating with a third-party data source to retrieve a profile for the taxpayer, a tax interview user interface for conducting a tax interview with the user, wherein the tax interview user interface allows the user to confirm that the profile corresponds to the taxpayer, and wherein the tax interview user interface pre-populates responses to the tax interview with tax data determined based on the profile for the taxpayer.

In a third embodiment, the invention includes one or more non-transitory computer-readable media storing computer executable instructions which, when executed by a processor, present a user interface for conducting a tax interview, comprising an interface element for identifying the taxpayer, an interface element for authenticating the taxpayer, an interface element for presenting a profile retrieved from a third-party data source to the user for confirmation that the profile corresponds to the taxpayer, and an interface element for receiving a tax data item for preparing a tax return for the taxpayer, wherein the interface element is pre-populated with a response based on the profile for confirmation by the user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention identify the taxpayer and then use this identification to retrieve relevant information for the taxpayer from various third-party data sources. In some embodiments of the invention, this retrieval of relevant information is performed without requiring the user to identify the third-party data source from which the information is retrieved and further without requiring the user to provide login information or other authentication information for obtaining relevant information from the third-party data source. Thus, the relevant information is obtained without requiring the user to affirmatively seek out or request the information or provide information necessary to obtain the relevant information. For example, if the taxpayer has a profile on a social network, that profile may include a "relationship status" field that is visible to the public. This field may be used to pre-populate the "filing status" field of the tax return being prepared. Similarly, if the "current city" field on the user's social network profile changes over the course of the year, the user may be prompted with questions related to moving expenses.

Other third-party sources of information can also be used to facilitate the tax interview process. For example, public records indicating property ownership could be used to prompt the user with questions about deducting mortgage interest or about rental income, and a newly added "student loan" entry on a credit report could be used to prompt the user with questions about education tax credits or student loan interest deductions.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

I. Operational Environment for Embodiments of the Invention

Figure 1:
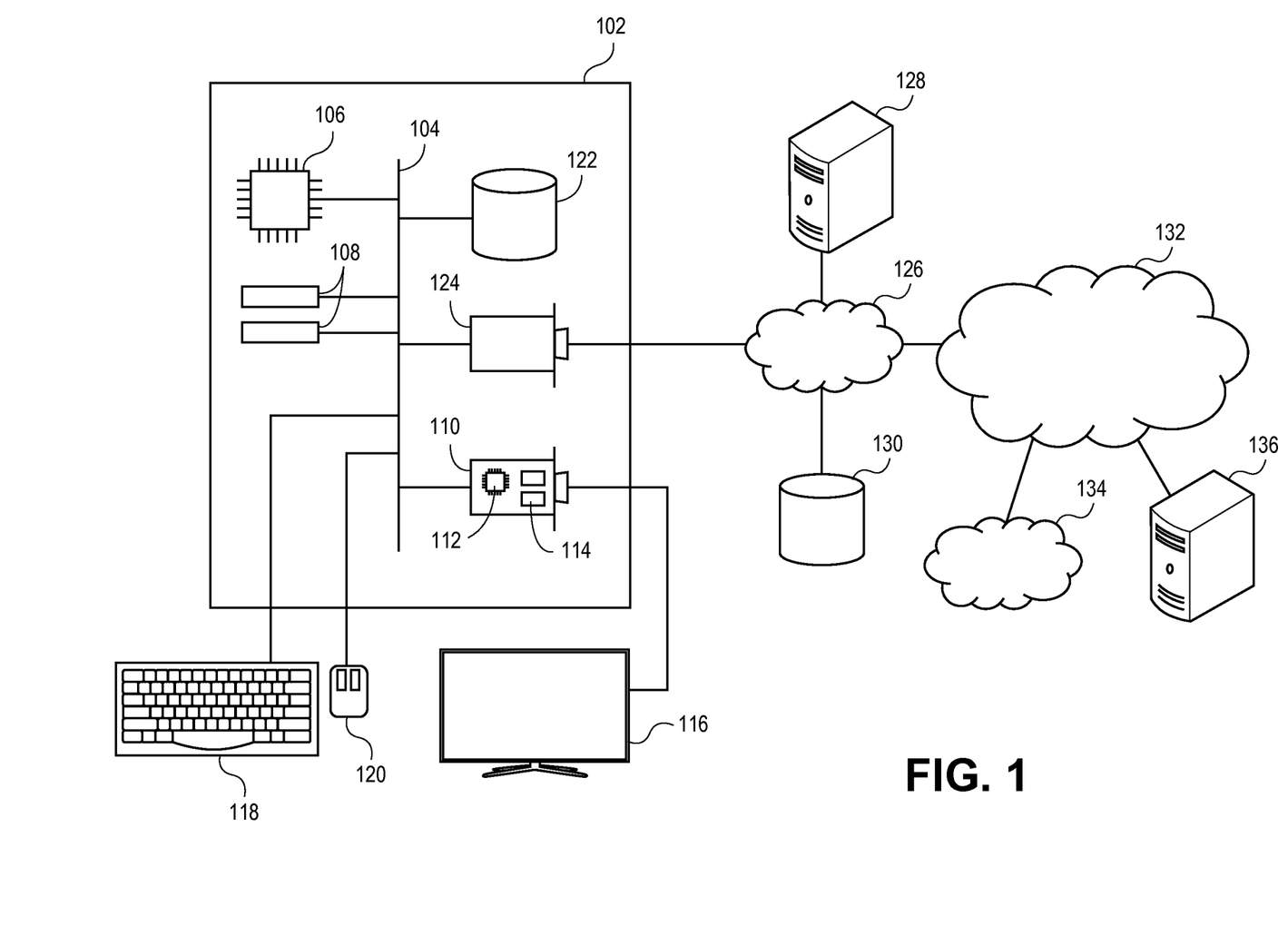
FIG. 1 depicts an exemplary hardware platform for certain embodiments of the invention.

Turning first to FIG. 1, an exemplary hardware platform that for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

II. Operation of Embodiments of the Invention

Figure 2:
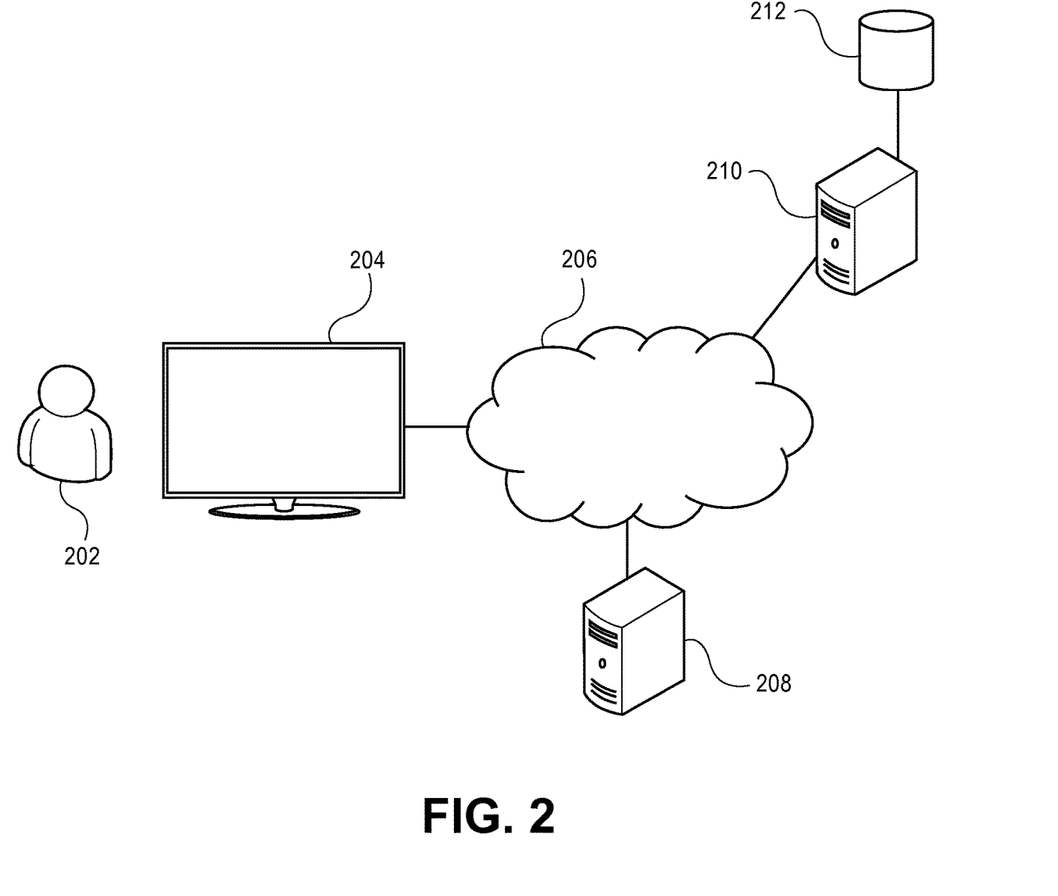
FIG. 2 depicts a system in accordance with embodiments of the invention.

Turning now to FIG. 2, a system in accordance with embodiments of the invention is depicted. User 202 is using computer 204 for the tax interview process. It should be appreciated that the tax situation and tax data items discussed herein relate to a particular taxpayer, although a user of the invention may be the taxpayer or a third party operating on behalf of the taxpayer, such as a professional tax preparer ("tax professional") or an authorized agent of the taxpayer. Therefore, use of the term "taxpayer" herein is intended to encompass either or both of the taxpayer and any third party operating on behalf of the taxpayer. Additionally, a taxpayer may comprise an individual filing singly, a couple filing jointly, a business, or a self-employed filer.

Computer 204 presents a user interface for the tax interview to the taxpayer. This interface is discussed in greater detail below with respect to FIGS. 4 and 5, but broadly it functions to receive items of tax data information from the user. It is an object of the invention to both reduce the amount of information that the user must enter and to reduce the error rate for information that the user does enter. Both of these can be accomplished by replacing information that the user must enter with information that the user can merely confirm to be correct. In order to pre-populate these tax data items, computer 204 communicates via network 206 with server 208.

In some embodiments server 208 is a central server (such as, for example, a web server) that provides the interface to many computers like computer 204. In other embodiments, the functionality provided by server 208 can be integrated into computer 204. Broadly speaking, it is the function of server 208 to prepare the tax return based on user 202's responses to the tax interview and imported data (e.g., wage statements such as W-2s, supplementary income statements such as 1099s, and deduction statements such as 1098s). In traditional tax-preparation systems, the element corresponding to server 208 takes input directly from the user to complete the tax return or determine tax forms to import from their respective providers. More recently, tax preparation systems have begun saving basic demographic information (e.g., the taxpayer's name, social security number, and address) from year to year. This information can then be presented to the user to confirm the user's taxpayer information, rather than requiring that the user re-enter it with the attendant chance for error.

However, such pre-population is generally not available to a taxpayer the first time they use the service, and it cannot be used (or it may pre-populate incorrect entries, requiring correction by the user) where the user has encountered significant life events (e.g., marriage, graduation, or a new job). However, it is likely that demographic information and a record of such life events is stored elsewhere. For example, the user's demographic information may be available from a credit-reporting agency's server such as third-party data server 210.

Third-party data server 210, with attached third-party data store 212, stores and makes available a variety of data about the taxpayer that can be used to pre-populate their tax return. In some embodiments of the invention, a plurality of third-party data servers can be used to collect different information about the taxpayer, or to provide higher confidence in the information collected from a single third-party data server. For example, a credit report for a taxpayer could include more than one address, and the current address could be determined by cross-referencing the credit report with demographic information from social media and property ownership records from a county registrar of deeds.

One of skill in the art will appreciate that any source of data about the taxpayer could include information usable to complete tax forms. For clarity, however, the term "third-party data source," as used herein, refers to data usable to opportunistically populate a tax return, as contrasted to tax forms specifically imported by the user as a part of preparing the return. Numerous examples are given below of third-party data sources, but such examples are intended to be illustrative rather than exhaustive.

As described above, a user's social media profiles can be used to obtain information usable to pre-populate portions of the tax interview. This information can be either directly imported from user metadata fields in the social media profile (e.g., marital status, state of residence, employer, or college attended), inferred from changes in the social media profile, or inferred from other content on the social media profile. These latter two cases warrant further discussion below.

In certain cases, the relevant life event for tax purposes stems from a change in the taxpayer's circumstances. For example, the taxpayer changing jobs over the course of the tax year may indicate that the user should be prompted for expenses related to job searching, for unemployment income, and to import income statements from the new employer as well as the old employer. Looking solely at social media profile only once, at the time the tax return is being prepared, will miss these details. Similarly, a changed address may indicate that the user should be prompted for moving expenses, and a change in marital status may indicate that the user should be prompted for alimony expenses or income. As such, certain embodiments of the invention will monitor the taxpayer's social media profile over the course of the tax year so as to collect historical information as well as changes in the information that indicate tax-relevant life events.

Tax-relevant life events may also be inferred from the user's social media profiles even where they are not explicitly tagged as such. In some embodiments, this can be done by performing image recognition on an image in the profile to identify the tax-relevant life event. For example, if the taxpayer posts a picture of a graduation, this image may be recognized and the user prompted for education expenses and tax credits, student loan interest deductions, and other tax interview portions related to graduation and job searching. In some embodiments, explicit information may be combined with implicit information to determine the appropriate prompts. For example, if the graduation picture above is recognized using image recognition, but the user's employment status remained unchanged, it may be the case that the taxpayer's child has graduated. This will cause a different set of information to be pre-populated and/or a different set of interview portions to be presented to a user. Similarly, if an image of a newborn is recognized, it may cause the user to be presented with additional questions about dependents and health-care expenses. One of skill in the art will appreciate that photographs of other life events may be recognized using image recognition and the appropriate prompts or interview portions presented accordingly. Thus, embodiments of the invention are operable to determine information associated with the taxpayer, analyze whether the determined information is different from known information for the taxpayer, and make deductions or suppositions based on the analysis.

Other forms of unstructured information may also be analyzed to infer tax-relevant information. For example, a user's resume, obtained from a professional networking site, can provide employment information usable to pre-populate the tax interview. Similarly, event invitations, such as an accepted invitation to attend a job fair, may indicate that the user should be prompted with interview questions about job-hunting expenses.

The use of a variety of third-party data sources such as data source 210 is contemplated. Some third-party data sources may provide a wide variety of information on the taxpayer, while others may only provide a single data item. As described above, social media websites (such as, for example, Facebook™ or LinkedIn™) can serve as a source of information about the taxpayer. In some embodiments, social media aggregators such as Spokeo can be used in addition or instead. Similarly, other data aggregators such as credit bureaus (e.g., Experian, Equifax, or TransUnion) and public records sites (e.g., Lexis PeopleWise or Westlaw PeopleMap) similarly provide a broad range of information about the taxpayer.

Other data sources may provide more limited or specialized information about the taxpayer. Health-care coverage aggregators can be used to determine whether the taxpayer has required health insurance coverage. Similarly, the Social Security Death Master File can indicate that the taxpayer is deceased and provide an appropriate interview. As discussed above, property tax records can be used to determine home ownership for the purposes of prompting the taxpayer about rental income or mortgage interest deductions. The Department of Defense makes available tools to determine military service within the past tax year, and the Customs and Immigration Service can provide citizenship information for the taxpayer. Financial services aggregators can be used to determine a taxpayer's wealth profile, which can in turn be used to tailor investment-related portions of the tax interview or prompt the user with sources for tax documents.

Once the various third-party data sources 210 have been consulted regarding the taxpayer, the tax interview can be presented to the user with the relevant fields pre-populated with the data from the third-party data sources. In some embodiments, the response determined to be most likely to be correct is pre-populated in the response field for the tax interview. If this response is incorrect, the user can enter a corrected response. In other embodiments, the user can select from each of the possible pre-populated responses (using, for example, a drop-down menu) or enter a corrected response by hand if it is not present. In this way, first-time users can share the advantages enjoyed by returning users of not having to manually enter basic information, and returning users have the advantage that previously entered information can be automatically updated when their tax situation changes.

Figure 3:
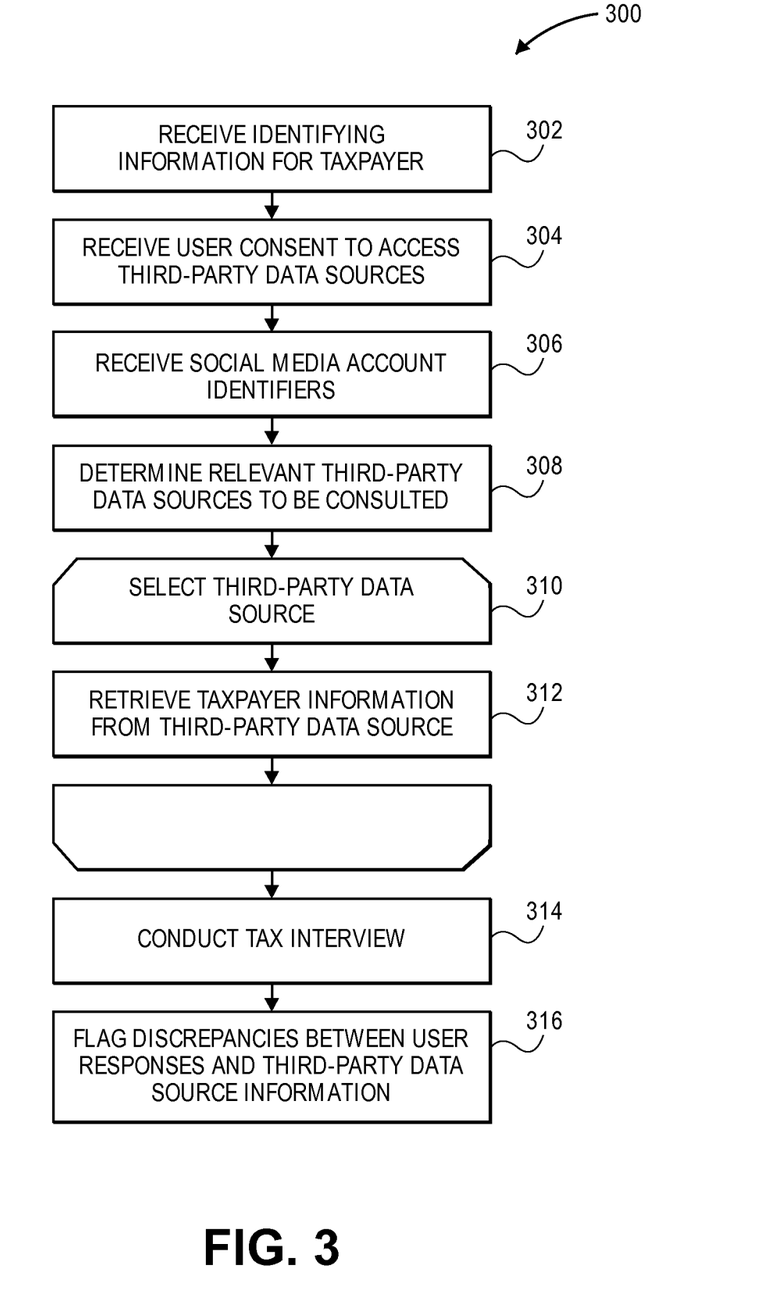
FIG. 3 depicts a flowchart illustrating a method in accordance with embodiments of the invention.

Turning now to FIG. 3, a flowchart illustrating a method in accordance with embodiments of the invention is depicted and generally referred to by reference numeral 300. The method begins at a step 302, where the user inputs identifying information for the taxpayer. As discussed above, the user may be the taxpayer, one member of a married couple filing jointly, or a tax professional acting on behalf of the taxpayer. In some embodiments, this identifying information is a previously established username and password. In other embodiments, it is instead the taxpayer's name, social security number, date of birth, and other demographic information needed to complete a tax return. In still other embodiments, out-of-wallet questions or other proof-of-identity information is provided to ensure that the taxpayer is who they claim to be.

Next, at a step 304, the user in some embodiments provides their consent to the system to search a variety of third-party data sources such as third-party data source 210. In many cases, in order to access such third-party data sources, the accessor must certify that they have a bona fide reason to do so, such as a law-enforcement purpose or, in this case, consent by the user whose information is being accessed. In some embodiments, consent may be provided separately for different data sources. For example, a user may allow the system to access their credit reports, but not be comfortable allowing the system to access their health-care records to verify health-insurance coverage and determine potential medical expenses that could be deducted. In other embodiments, the user provides a general consent for the system to access all available third-party data sources. Once the user has provided consent (or declined to provide consent) for each data source or type of data source or information, the list of data aggregators to be consulted can be determined.

Processing then proceeds to a step 306 where the user identifies for the system one or more social-media identifiers associated with the taxpayer. This may be necessary where, for example, the identifying information previously provided by the user matches multiple accounts of a given social network. In some embodiments, the information provided by the user is used to search the available profiles on each social networking site and provide a candidate list to the user to identify which, if any, correspond to the taxpayer. In other embodiments, the user can directly input account identifiers (such as, for example, email addresses or usernames) for the taxpayer for various social networking sites.

In some embodiments, only publicly available information from the user's profile is used to gather tax-relevant information for the taxpayer. In other embodiments, both publicly available and limited-access information may be used. In such embodiments, the user may additionally provide a password or other access token for the social network or networks to allow the system to import limited-access information. Although social networking sites have been discussed explicitly in the discussion of step 306, one of skill in the art will appreciate that the same principle can be applied to a wide variety of the taxpayer's accounts. For example, the user may choose to provide access information to their online banking account or financial management service provider account. By accessing such an account, the system may be able to determine additional tax-relevant information such as a list of financial accounts for which the user should be prompted to import tax statements. As another example, the user may provide an account for the taxpayer used with a previous tax-preparation service. Such an account can be used to import historical data similar to that available for returning users of the service. Once the user has identified the accounts and any necessary authentication information, the list of taxpayer accounts to be consulted can be determined.

In yet further embodiments, the user need not identify one or more social-media identifiers associated with the taxpayer. Instead, the system may proactively search social-networking sites, professional networking sites and/or other third-party data sources for information associated with the user and, if one or more such sites have profiles that can be linked to the taxpayer, then information from those profiles is automatically imported for later use in preparing the return. Thus, information can be imported from third-party data sources without the user providing the corresponding account identifiers for the third-party data sources. For example, if the user's name corresponds to a Facebook account with details matching those that are already known, than information from that Facebook profile can be imported the user having to identify the Facebook profile explicitly or confirm that it matches the taxpayer.

Once the taxpayer's information has been imported, processing can proceed to a step 308 where the system consults the lists of data aggregators and taxpayer accounts to determine the lists of relevant third-party data sources to be consulted. In some embodiments, the relevant third-party data sources include those data sources for which the user has given consent and those data sources for which the user has identified an account for the taxpayer. In other embodiments, the third-party data sources to be consulted further comprise those for which no consent is required, or those data sources for which an account for the taxpayer can be identified automatically.

Next, at step 310, a data source of the list of relevant third-party data sources to be consulted is selected, and at step 312, information is retrieved from the selected third-party data source. In some cases, it may be the case that the information about the taxpayer input by the user and already retrieved from other third-party data sources is insufficient to identify the user's record in the data store of the third-party data source. This may be the case where, for example, the user shares a common name with other users on a data aggregation site. In some embodiments, such data sources may be set aside to be revisited once additional identifying information for the taxpayer has been obtained. In this way, information from a first data source can allow additional information to be obtained from a second data source. In other embodiments, information for all matching profiles may be retrieved for the user to select from. This process is then repeated for each third-party data source to be consulted, until no additional information can be retrieved from any of the third-party data source.

Once the information for the user has been retrieved, the tax interview process can begin at step 314. Exemplary user interfaces for the tax interview process are depicted below in FIGS. 4 and 5. As discussed above, information gathered about the taxpayer earlier in the process can be used to pre-populate a response field or suggest responses to tax interview questions. For example, if the user's "relationship status" on a social network is "married," a first embodiment could present the interview question "Are you married?" with the radio button for "Yes" pre-selected. A second embodiment could instead present the question as "It looks like you're married. Is this correct?" Other ways of allowing the obtained information to be used to pre-populate questions in the tax interview are also contemplated. For example, a taxpayer's credit report will commonly provide a list of addresses associated with the taxpayer. When asking the user to enter the taxpayer's address, a dropdown can provide these addresses for the user to select from, together with an "Other" option for the user to add a different address.

Other, non-demographic information can also be pre-populated in this way. For example, if the taxpayer's resume on their professional networking profile indicates that they have worked at two jobs during the previous tax year, then the user can be prompted to import wage statements (e.g., W-2s) for each of those jobs. Bank accounts for which tax statements should be imported can similarly be prompted for when they are detected (in, for example, a user's credit report). Likewise, if it is detected that the taxpayer attended college during the tax period, then the portions of the tax interview relating to education tax credits can automatically be presented without the need to ask the user "Did the taxpayer attend college during the previous tax year?"

Next, at a step 316, the information input by the user can be compared against the information retrieved from the third-party data sources for consistency and any discrepancies flagged. In some embodiments, flagged discrepancies are presented to the user for review. In some such embodiments, the source of the discrepancy may be presented to the user to assist in resolving the discrepancy. For example, the user may be presented with the prompt "Warning: your LinkedIn profile lists a job at EmployCo for this tax year, but you have not added a W-2 for EmployCo. Would you like to add one now?" In other embodiments, flagged discrepancies are used as a factor in calculating an audit likelihood score for the tax return being prepared. In still other embodiments, flagged discrepancies are used as a factor in calculating a fraud likelihood score for the tax return being prepared.

In some embodiments, the information collected about the taxpayer may be compared to information gathered about other taxpayers to determine a "Taxpayers Like You" profile to suggest other relevant portions of the tax interview or tax forms to the taxpayer, even if they would not be indicated based solely on the taxpayer's own information. For example, if historical data indicates that users with a significant number of connections on social networks to other users who list their jobs as "Farmer" are likely to report farm income on their tax returns, and the taxpayer's social media profile fits this pattern, the user may be prompted for farm income even if the information imported for the taxpayer would not otherwise suggest doing so. In this way the system can use data obtained from third-party data sources to identify tax information that confirms information entered by the user, contradicts information entered by the user, or identifies information omitted by the user.

Figure 4:
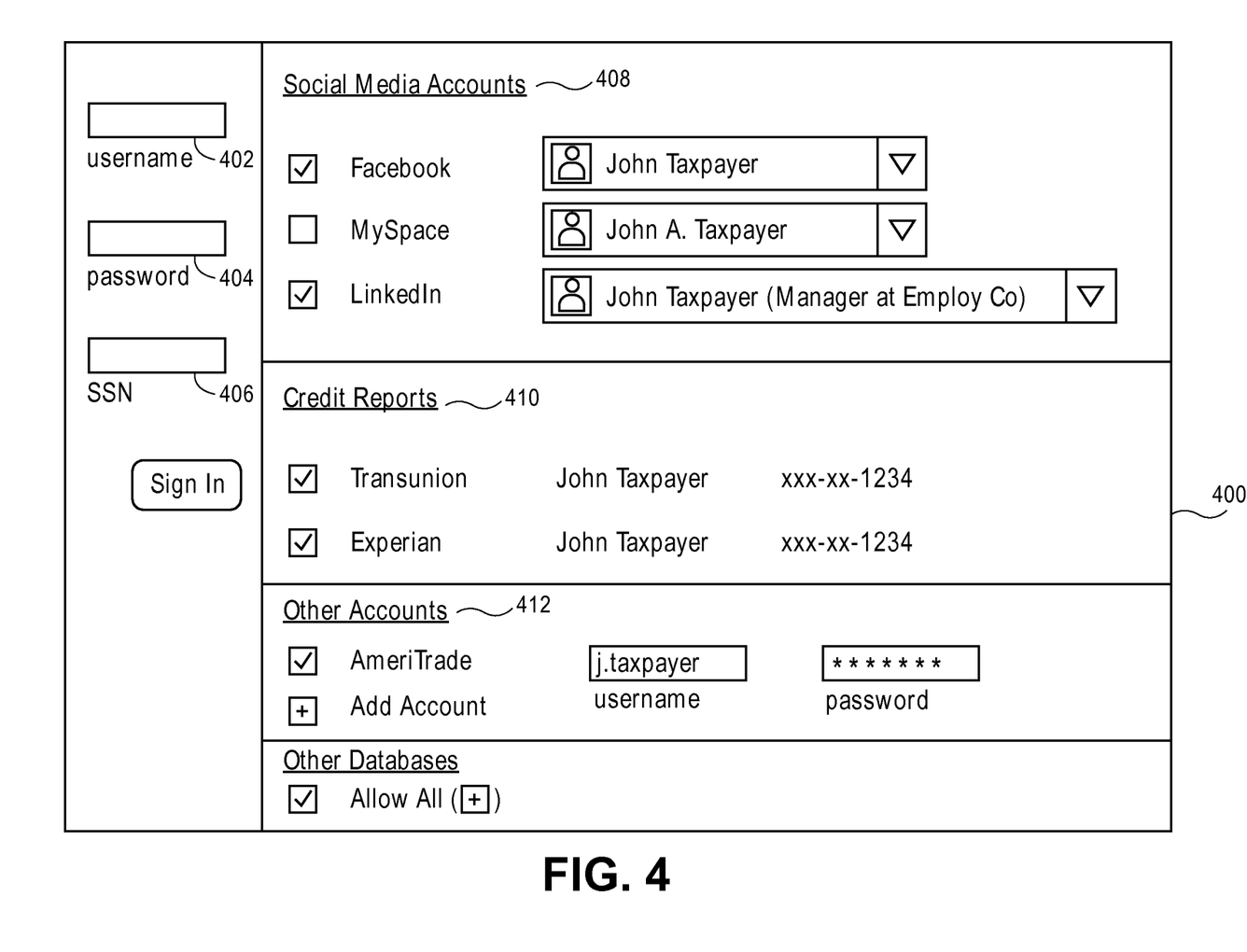
FIG. 4 depicts an exemplary user interface in accordance with embodiments of the invention.

Turning now to FIG. 4, an exemplary user interface in accordance with embodiments of the invention is depicted and generally referred to by reference numeral 400. Interface 400 includes a first element 402 for the user to input identifying information for the taxpayer and a second element or set of elements 404 for authenticating the user. In various embodiments, the method for authenticating the user will vary depending on prior use by the taxpayer of the system. Because it is undesirable to present potentially personal identifying information about the taxpayer to someone other than the taxpayer, a first-time user may be required to provide more authenticating information than a returning user. For example, a first-time user may be required to answer out-of-wallet question or otherwise provide supplementary authentication information, while a user who has previously filed a tax return using the system which was not challenged as fraudulent may be able to authenticate using only a previously established password. In some embodiments, interface 400 will further include a field 406 for the user to confirm the taxpayer's social security number or taxpayer identification number.

Interface 400 further includes the available and identified accounts for the taxpayer. As depicted, these accounts are divided into categories for the user's convenience, including Social Media Accounts 408, Credit Reports 410, Other Accounts 412, and Other Databases 414. The user can then consent to the use of each account or database, or correct the account if the wrong account has been identified. For example, under Social Media Accounts 418, a variety of social media networks may be included with the accounts identified for the taxpayer. For each such network, the user can consent to the use of information from that network by checking (or leaving checked) the appropriate checkbox, or correct the account using the dropdown menu displaying the identified account. For other fields, such as Credit Reports 410, there may be significantly lower chance for incorrect reports (because the taxpayer has supplied a social security number that can be compared to that in the credit report), and so there may only be the option to use or not use the information form the credit report.

For other types of account, such as the brokerage account depicted under Other Accounts 412, the user may be required to supply a username and/or password for the account in order for the system to be able to access the information, and fields for entering this information may be provided. Additional provisions may be made in this (or other categories) for the user to supply additional accounts that were not automatically detected. In still other categories, such as Other Databases 414 in the depicted embodiment, the list of available accounts or databases may be initially collapsed, with a single checkbox for the user to consent to the use of all (or none) of the accounts or databases in that category. In some such embodiments, there may be provision made for the user to expand the initially collapsed list to consent to the use of individual databases and decline consent to others.

Figure 5:
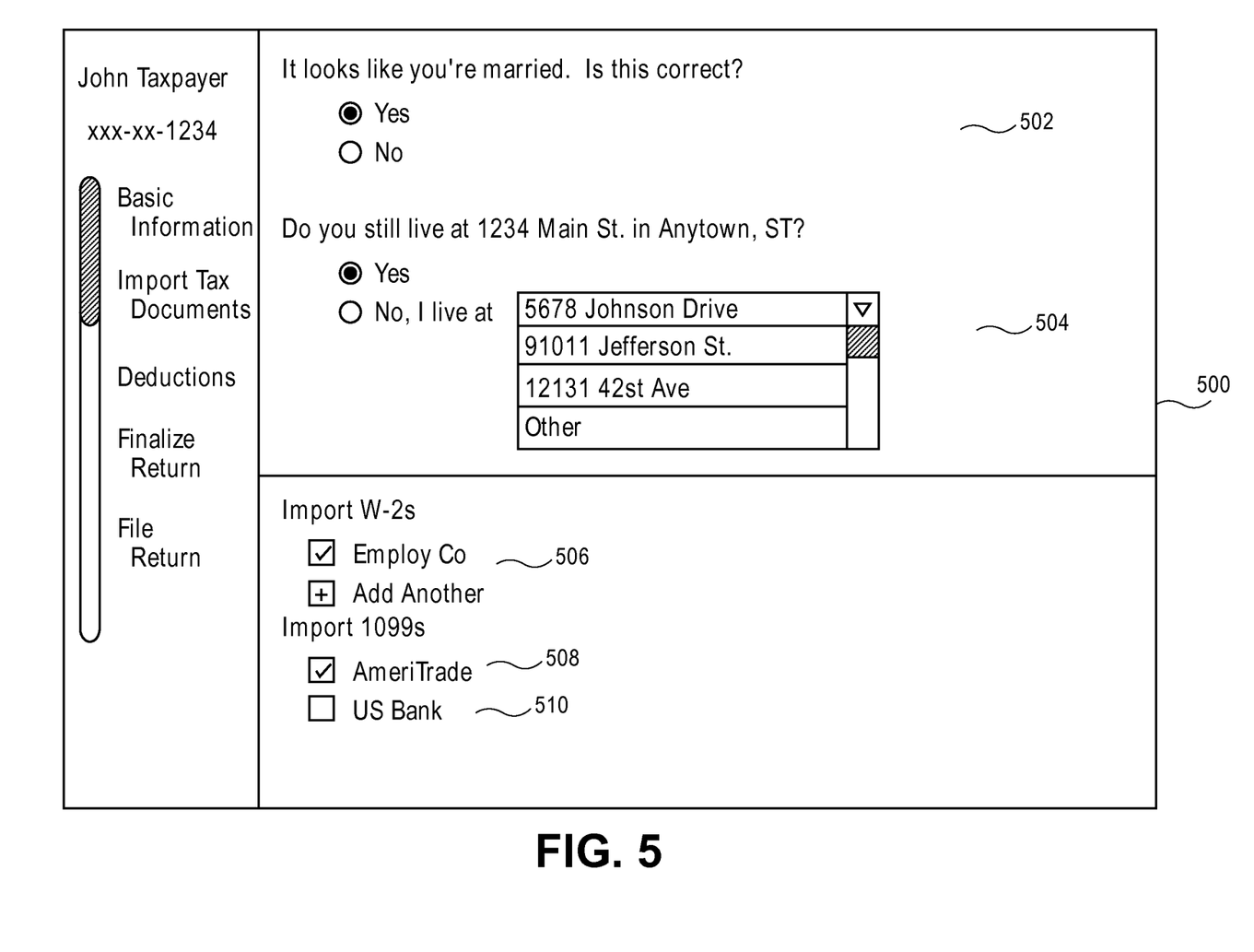
FIG. 5 depicts an additional exemplary user interface in accordance with embodiments of the invention.

Turning now to FIG. 5 an additional user interface in accordance with embodiments of the invention is depicted and referred to generally by reference numeral 500. Interface 500 provides a smart tax interview to the user based on the information imported about the taxpayer by the system from the third-party data sources identified by interface 400. Broadly speaking, any question in the tax interview may be answered based on the imported information or have a response pre-populated based on the imported information. In some embodiments, interview questions that cause additional portions of the tax interview to be presented may be skipped (and the additional interview portions presented) based on imported information, while tax data information based on imported information is pre-populated and presented to the user for confirmation or used to prompt the user.

For example, in the case depicted in FIG. 5, the user's marital status 502 (as obtained from a social networking profile) and address 504 (as obtained from the taxpayer's credit report) have been pre-populated and presented to the user for confirmation. Similarly, the user's employer (as obtained from the taxpayer's professional networking profile) has automatically been included as wage statement to be imported 506. However, the user can deselect wage statement to be imported 506 and/or add an additional wage statement as needed. By contrast, because it was determined that the taxpayer has brokerage account 508 and bank account 510 (based on the taxpayer's credit report and supplied AmeriTrade accounts, respectively), the portions of the tax interview that would otherwise be necessary to determine whether to prompt the user for supplementary income statements have been skipped altogether. Again, however, if the user's bank account has not earned enough interest to provide an interest income statement, bank account 510 can be unchecked to skip importing it.

To more clearly illustrate the operation of embodiments of the invention, an exemplary scenario is provided in accordance with FIGS. 4 and 5. A first-time user of the tax-preparation system, John Taxpayer, creates an account, specifying their name and social security number, as well as a username and password for subsequent use of the system. Because the user has not previously used the system, the user must provide supplementary authentication information to prove that they are entitled to access the personally identifiable information for John Taxpayer. Once this is done, the user is prompted on interface 400 for social media accounts. Because "Taxpayer" is a moderately common name, both matching and non-matching social media accounts are found. By geolocating the user's IP address, the most likely Facebook profile is populated in the Facebook dropdown, and the user does not need to change anything. Because the taxpayer does not have a MySpace profile, an incorrect profile is selected, and the user unchecks the relevant checkbox to indicate that it should not be used. The user wishes to import the LinkedIn profile as well, and so leaves the corresponding checkbox checked, but must use the dropdown menu to select the correct profile. Because the user has specified the taxpayer's social security number and the user consents to their use, the information under heading Credit Reports 410 can be left alone. No accounts were pre-populated under heading Other Accounts 412, but the user supplies type, username, and password for John Taxpayer's AmeriTrade account. Finally, the user consents to the use of all of the databases falling under the heading Other Databases 414 (as described above), so a blanket consent can be given using the appropriate checkbox.

Once the corresponding information has been retrieved from the appropriate third-party data sources, the user can be presented with interface 500. In that interface, the user can leave marital status 502 and address 504 unchanged, as the correct information has been imported from the taxpayer's social media profile and credit reports. Similarly, the user need not specify that the system should import a wage statement from the payroll provider for EmployCo, as this information was automatically populated based on the user's professional networking profile, and the user can move directly to the supplementary income statements. The investment income statement corresponding to the taxpayer's brokerage account has automatically been selected for importation, as has an interest income statement for the user's bank account. However, because the user did not receive sufficient interest income to receive an interest income statement from the bank, the user can simply uncheck the corresponding box. In this fashion, the tax interview can proceed quickly and accurately with lower user effort and probability of error.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for automated population of responses to a tax interview based on third-party data sources, comprising steps of:

receiving a request, from a user, to prepare a tax return for a taxpayer;

receiving information identifying the taxpayer;

accessing known information for the taxpayer;

periodically throughout a tax year, retrieving a social media profile for the taxpayer from a data aggregator data source, wherein the social media profile is retrieved without the taxpayer providing corresponding account identifiers for the third-party data sources, wherein the social media profile includes an image associated with the taxpayer;

performing an image information analysis of the image associated with the taxpayer using image recognition to identify a recognized image, wherein the recognized image is recognized based on automatically recognizing at least one of a tax-relevant object and a tax-relevant event;

detecting the tax-relevant object or tax-relevant event based on comparing the recognized image to information gathered about other taxpayers;
deducing a potential profile difference between the taxpayer's known information and the image analysis based on the detecting;
in response to the performed image information analysis, determining at least one item of a plurality of items of updated profile information from the social media profile;
determining, based on the at least one item of a plurality of items of updated profile information in the social media profile and historical data patterns gathered about other taxpayers when it would not be indicated based solely on information associated with the taxpayer, an updated response to a question in the tax interview;
pre-populating the tax interview with the updated response to the question in the tax interview;
presenting a first portion of the tax interview with a user interface element including the pre-populated response to the user for confirmation;
receiving confirmation, from the user, that the pre-populated response is correct; and
preparing the tax return based on the pre-populated response.

2. The method of claim 1, wherein the data aggregator data source comprises data from an employer.

3. The method of claim 1, wherein the data aggregator data source comprises data from a professional networking site.

4. The method of claim 1, wherein the data aggregator data source comprises data from a credit bureau.

5. The method of claim 1, wherein:
the social media profile is a first profile, the data-aggregator data source is a first data source, the pre-populated response is a first response, and the question is a first question, and
further comprising the steps of:
retrieving a second profile from a second data source based on the updated profile information contained in the first profile,
determining, based on the second profile, a second response to a second question in the tax interview; and
pre-populating the tax interview with the second response to the second question in the tax interview, wherein the second data source is verified from data obtained from the first data source.

6. A system for facilitating a tax interview by a tax professional for a taxpayer based on third-party data sources, comprising:
a server, programmed to perform steps comprising:
accessing known information for the taxpayer;
periodically throughout a tax year, communicating with a data aggregator data source to retrieve a social media profile for the taxpayer and detecting a change to the social media profile, wherein the social media profile is retrieved without the taxpayer providing corresponding account identifiers for the third-party data sources,
wherein the social media profile includes an image associated with the taxpayer;
performing an image information analysis of the image associated with the taxpayer using using image recognition to identify a recognized image,
wherein the recognized image is recognized based on automatically recognizing at least one of a tax-relevant object and a tax-relevant event;
detecting the tax-relevant object or tax-relevant event based on comparing the recognized image to information gathered about other taxpayers;
deducing a potential profile difference between the taxpayer's known information and the image analysis based on the detecting;
in response to the performed image information analysis, determining at least one item of a plurality of items of updated profile information from the social media profile;
wherein the profile comprises a plurality of items of updated profile information; and
a tax interview user interface for conducting a tax interview with the user,
wherein the tax interview user interface allows the user to confirm that the profile corresponds to the taxpayer,
wherein the tax interview user interface provides a plurality of possible responses to an interview question,
wherein the plurality of possible responses is determined based on the potential profile difference between the taxpayer's known information and the retrieved profile and on historical data patterns gathered about other taxpayers when it would not be indicated based solely on information associated with the taxpayer,
wherein the tax interview user interface, periodically throughout the tax year, pre-populates an updated response to the interview question based on at least one item of the plurality of items of updated profile information,
wherein the pre-populated response is selected from the plurality of possible responses based on the at least one item of the plurality of items of updated profile information, and
wherein the tax interview user interface allows the user to confirm that the pre-populated response is correct.

7. The system of claim 6, wherein the data aggregator data source comprises data from an employer.

8. The system of claim 6, wherein the data aggregator data source comprises data from a professional networking site.

9. The system of claim 6, wherein the data aggregator data source comprises data from a credit bureau.

10. The system of claim 6,
wherein an additional portion of the tax interview is presented at least in part based on the plurality of items of updated profile information in the profile, and
wherein the plurality of possible responses is presented in a dropdown menu.

11. One or more non-transitory computer-readable media storing computer executable instructions which, when executed by a processor present a user interface for conducting a tax interview based on third-party data sources, comprising:
a first interface element for identifying a taxpayer;
a second interface element for authenticating the taxpayer;
a network interface element for:
accessing known information for the taxpayer;
periodically throughout a tax year presenting a social media profile retrieved from a data aggregator data source to a user corresponding to the taxpayer,
wherein the social media profile is retrieved without the user providing corresponding account identifiers for the third-party data sources, wherein the social media profile includes an image associated with the taxpayer;

performing an image information analysis of the image associated with the taxpayer using using image recognition to identify a recognized image, wherein the recognized image is recognized based on automatically recognizing at least one of a tax-relevant object and a tax-relevant event;

detecting the tax-relevant object or tax-relevant event based on comparing the recognized image to information gathered about other taxpayers;

deducing a potential profile difference between the taxpayer's known information and the image analysis based on historical data patterns identified in connection with information gathered about other taxpayers based on the detecting;

in response to the performed image information analysis, determining at least one item of a plurality of items of updated profile information from the known information; and a third interface element for determining an updated response to an interview question based on an at least one item of a plurality of items of updated profile information in the social media profile, wherein the third interface element for determining the updated response is pre-populated with a plurality of responses based on the plurality of items of updated profile information for selection by the user.

12. The computer-readable media of claim 11, wherein the data aggregator data source comprises data from at least one of: an employer a professional networking site, a credit bureau and a data aggregator.

13. The non-transitory computer-readable media of claim 11, further comprising a fourth interface element for presenting the image in the profile on which image recognition has been performed to identify a tax-relevant life event.

14. The non-transitory computer-readable media of claim 11, further comprising:

a fifth interface element for pointing out a discrepancy between a first tax data item provided by the user and a second tax data item imported from the profile.

15. The non-transitory computer-readable media of claim 11, wherein the profile is presented to the user for confirmation that it corresponds to the taxpayer.

16. The non-transitory computer-readable media of claim 11, wherein the user interface presents an additional portion of the tax interview based at least in part on an at least one item of the plurality of items of updated profile information in the profile.

\* \* \* \* \*